United States Patent [19]

Petrucci

[11] 4,097,016
[45] Jun. 27, 1978

[54] ROTATABLE SEAT SUPPORT ASSEMBLY

[75] Inventor: Primo O. Petrucci, Livonia, Mich.

[73] Assignee: Danbar, Inc., Warren, Mich.

[21] Appl. No.: 796,427

[22] Filed: May 12, 1977

[51] Int. Cl.² ............................................. F16M 13/00
[52] U.S. Cl. .................................. 248/418; 108/142;
297/349
[58] Field of Search .............................. 108/139–142;
248/349, 415–418; 297/349

[56] References Cited

U.S. PATENT DOCUMENTS

| 2,650,648 | 9/1953 | Nordmark et al. | 248/418 |
| 3,570,800 | 3/1971 | Cycowicz | 248/415 |
| 3,979,099 | 9/1976 | Strang | 248/418 |

Primary Examiner—James C. Mitchell
Attorney, Agent, or Firm—Robert G. Mentag

[57] ABSTRACT

A rotatable seat support assembly for supporting a vehicle seat or the like for swiveling movement in opposite directions. A seat pedestal means carries a support tube, around which is fixedly mounted a lower bearing ring. A seat support means having a central plate is mounted around the support tube and carries an upper bearing ring. A plurality of ball bearings is operatively mounted between the bearing rings. A stop plate is fixedly mounted over the upper bearing ring, and it is attached to a support plate that is fixedly mounted in the support tube. A stop member is fixedly carried on the central plate of the seat support means for limiting the rotative movement of the seat support means about the support tube. A releasable cam locking means is carried on the seat support means for releasable locking engagement with a slot formed in the stop plate.

11 Claims, 10 Drawing Figures

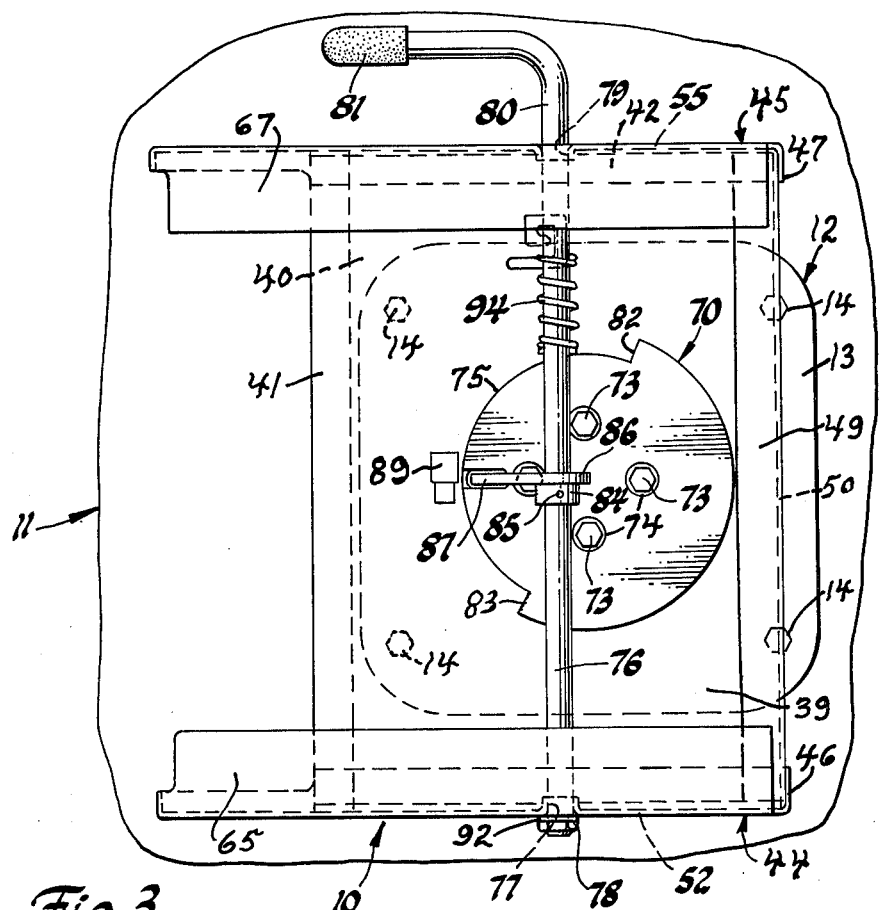
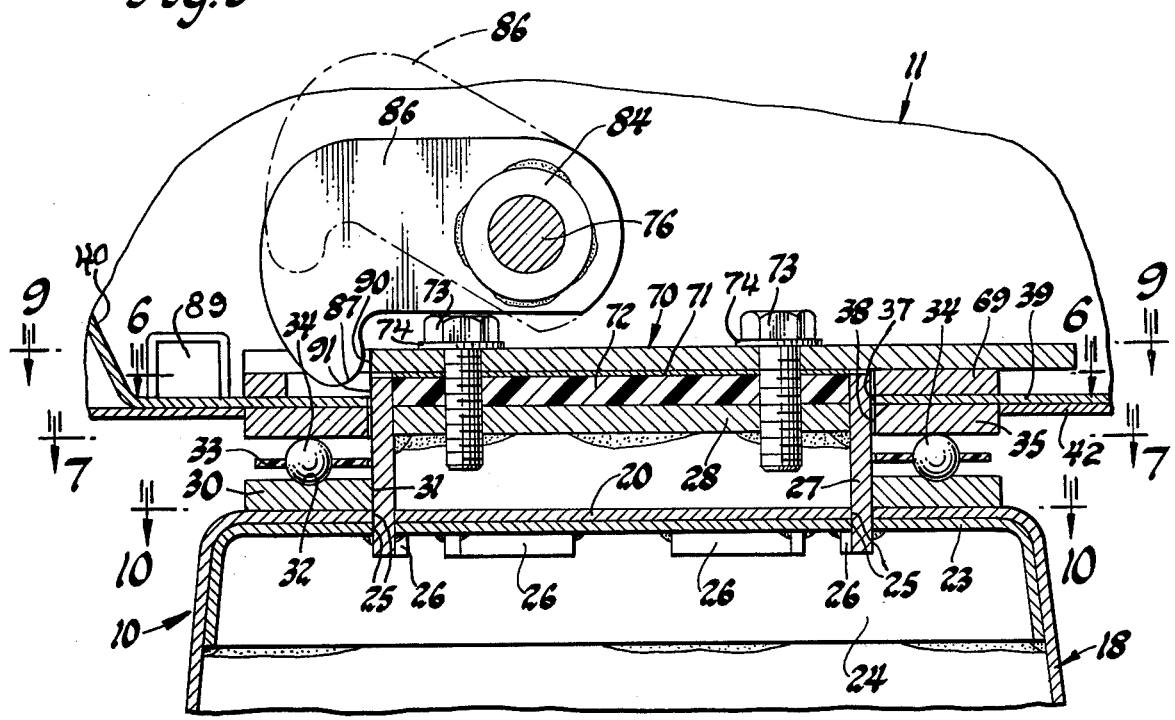

ROTATABLE SEAT SUPPORT ASSEMBLY

SUMMARY OF THE INVENTION

This invention relates to supporting means for seats, and in particular to a seat for a vehicle wherein the seat is adapted to be swung about a vertical axis.

It is an object of the present invention to provide an improved swivel seat for a motor vehicle and the like.

It is a more specific object to provide a swivel seat which is particularly adapted to serve as the front passenger seat of a motor vehicle.

It is still a further object of the present invention to provide an improved swivel seat for a motor vehicle, and the like, which includes a pedestal on which is rotatably mounted a seat support means for swiveling movement inboard and outboard from a normal forwardly facing position, and which is provided with an anti-noise means.

It is another object of the present invention to provide a rotatable seat support assembly for supporting a seat for swiveling movement in opposite directions, and which includes a seat pedestal means, a support tube fixedly mounted on the pedestal means, a circular bearing means mounted around the support tube, a seat support means mounted around said support tube, means retaining said seat support means on the bearing means, means for releasably locking the seat support means in a normal forwardly facing position, stop means for limiting the swiveling movement of the seat support means about the support tube, and anti-noise means mounted between the support tube and the means for retaining the seat support means on the bearing means.

It is still a further object of the present invention to provide a rotatable seat support assembly for supporting a seat for swiveling movement in opposite directions which is simple and compact in construction, economical to manufacture, and efficient in use.

It is a further object of the present invention to provide a rotatable seat support assembly for supporting a seat for swiveling movement in opposite directions, and which includes a fixed support tube having a support plate therein on which is operatively mounted a compression insert made from urethane or the like, and wherein the compression insert is secured in place by a wear plate and a stop plate which also retain a seat support means in a rotative position about the support tube. The compression insert functions as an anti-noise or anti-rattle means when the seat is in use, and when it is being swiveled about the fixed support tube.

Other objects, features and advantages of this invention will be apparent from the following detailed description, appended claims, and the accompanying drawings.

BRIEF DESCRIPTION OF THE DRAWINGS

FIG. 3 is a top plan view of the seat support assembly illustrated in FIG. 1, taken along the line 3—3 thereof, and looking in the direction of the arrows.

FIG. 4 is an enlarged, fragmentary portion of the upper end of the section view of FIG. 1.

DESCRIPTION OF THE PREFERRED EMBODIMENT

Figure 1:
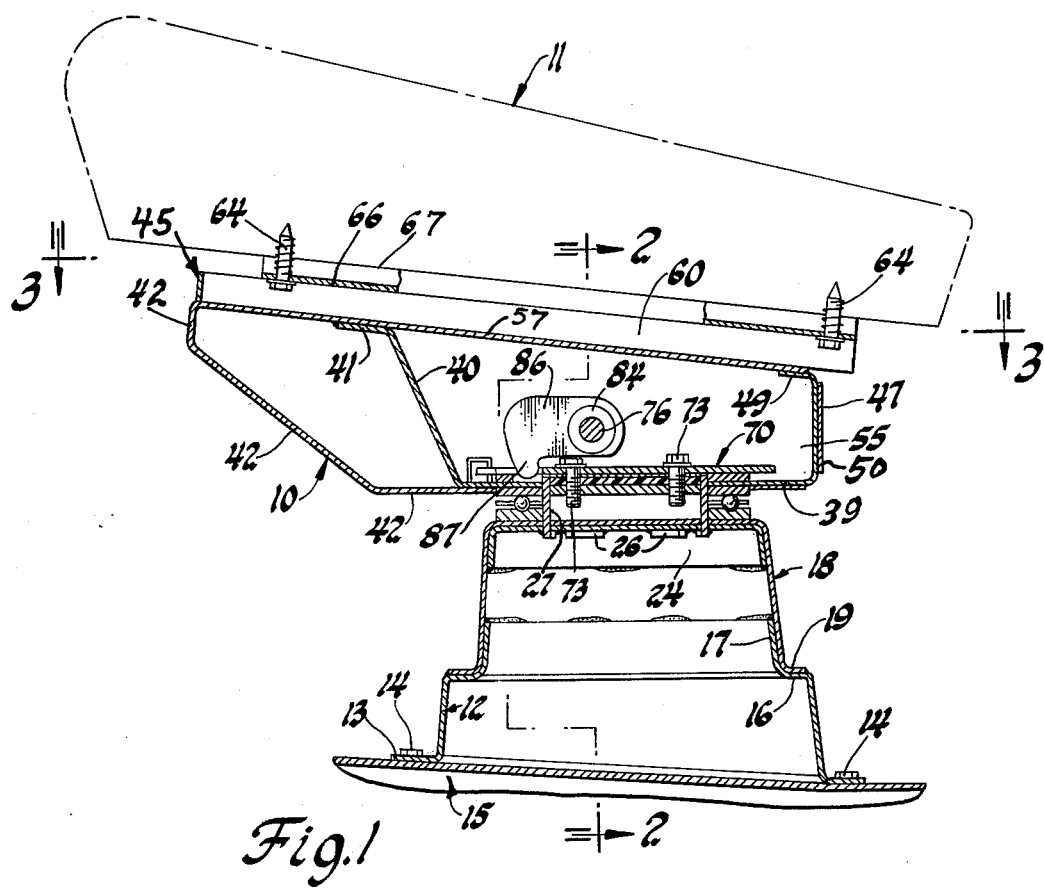
FIG. 1 is an elevation section view of a rotatable seat support assembly made in accordance with the principles of the present invention, taken along the line 1—1 of FIG. 2, and looking in the direction of the arrows.
Figure 2:
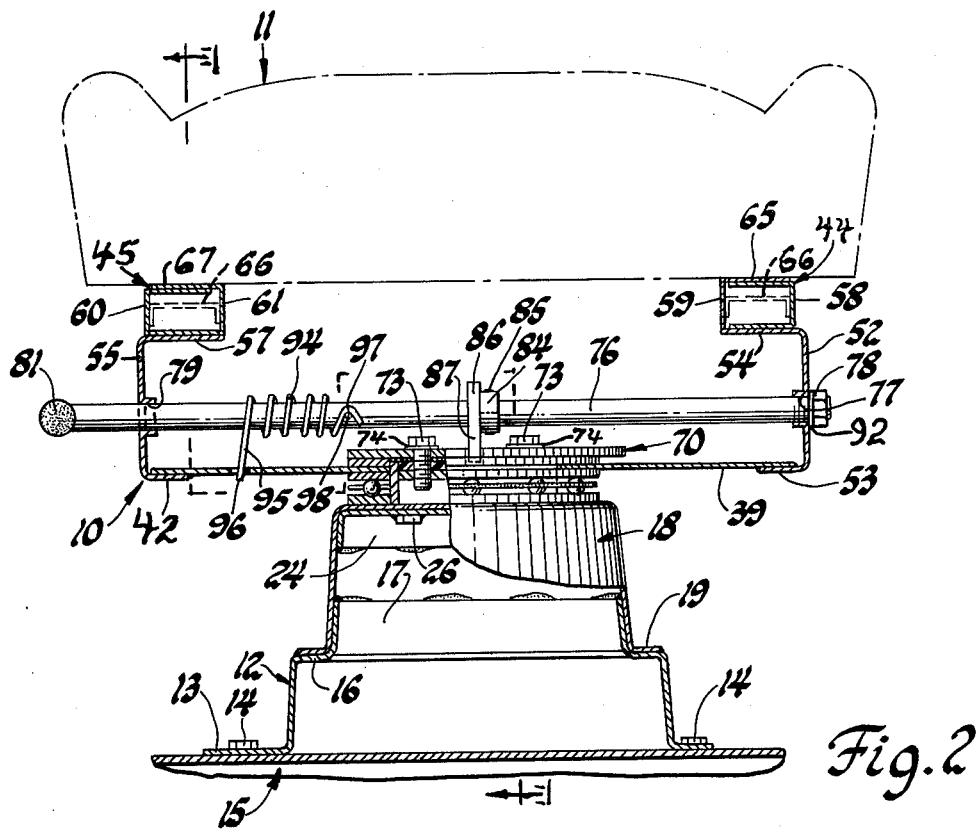
FIG. 2 is an elevation section view of the seat support assembly illustrated in FIG. 1, taken along the line 2—2 thereof, and looking in the direction of the arrows.

Referring now to the drawings, and in particular to FIGS. 1 and 2, the numeral 10 generally designates a rotatable seat support assembly made in accordance with the principles of the present invention, and on which is adapted to be mounted a conventional auto seat, generally indicated by the numeral 11. The seat support assembly 10 includes a seat riser portion, generally indicated by the numeral 12, on which is carried a seat base generally indicated by the numeral 18. The seat riser 12 comprises a stamping which includes a cylindrical portion that has integrally formed on the upper end thereof an inwardly extended flange 16. An upwardly extended cylindrical flange 17 is integrally formed on the inner end of the flange 16. The seat riser 12 includes an integral, horizontally extended flange 13 around the lower periphery thereof, which is adapted to be secured by suitable bolts 14 to the floor of a vehicle, or of a conventional seat slide assembly, indicated generally by the numeral 15 in FIGS. 1 and 2.

The seat base 18 is formed from a stamping which has a tubular side wall portion that is slidably mounted around the upwardly extended circular flange 17 on the seat riser 12. The seat base 18 is provided on the lower end thereof with an integral, outwardly extended peripheral flange 19 which is seated on the flange 16 of the seat riser, and secured thereto by any suitable means, as by welding. The flange 17 on the seat riser 12 is also secured by any suitable means, as by welding, to the seat base 18.

As best seen in FIG. 4, the upper end of the seat base 18 is enclosed by an integral, horizontal wall 20. A circular reinforcement plate 23 is seated underneath and against the seat base upper end wall 20.

The reinforcement plate 23 is provided with an integral, downwardly extended peripheral flange 24 which is seated against the inner face of the side wall of the seat base 18, and secured thereto by any suitable means, as by welding.

Figure 5:
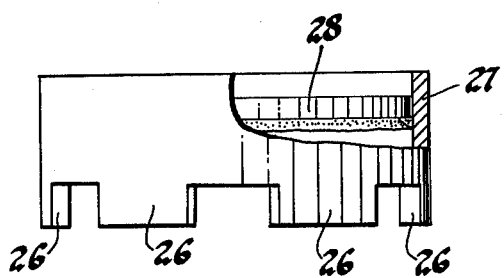
FIG. 5 is a side elevation view, with parts broken away and parts in section, and showing a support tube employed in the seat support assembly illustrated in FIGS. 1, 2 and 3.
Figure 10:
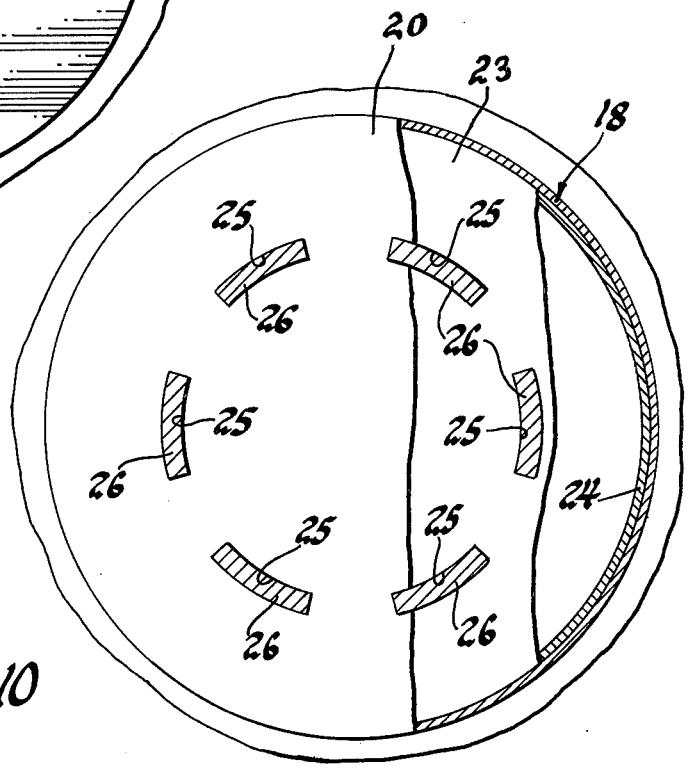
FIG. 10 is a fragmentary, horizontal section view of the structure illustrated in FIG. 4, taken along the line 10—10 thereof, and looking in the direction of the arrows.

As best seen in FIGS. 4 and 5, a vertical, circular support tube 27 is operatively mounted on the top end of the seat base 18. The support tube 27 is provided with a plurality of downwardly extended integral arcuate tabs 26 which extend down through mating arcuate slots 25 (FIG. 10) formed through the seat base top end wall 20 and reinforcing wall 23. The tabs 26 are fixedly secured to the seat base 18 by any suitable means, as by welding. As shown in FIGS. 4 and 5, a circular support plate 28 is mounted inside of the cylindrical support tube 27 in a position spaced downwardly from the upper end thereof. The support plate 28 is secured to the support tube 27 by any suitable means, as by welding.

Figure 7:
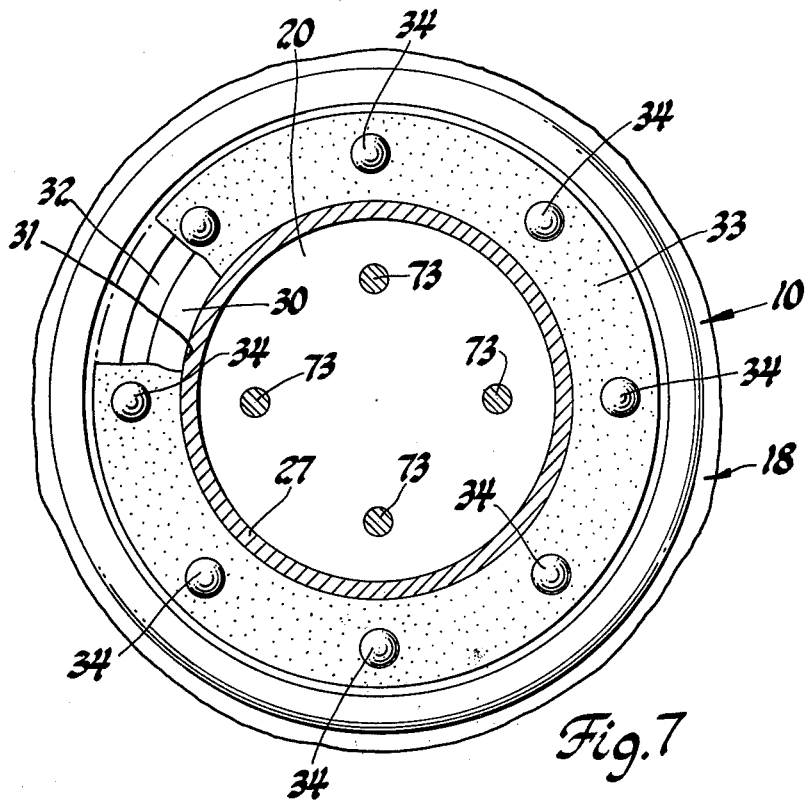
FIG. 7 is a fragmentary, horizontal section view, with parts broken away, of the seat support assembly structure illustrated in FIG. 4, taken along the line 7—7 thereof, and looking in the direction of the arrows.

As illustrated in FIGS. 4 and 7, a lower bearing plate 30, comprising a flat steel ring, is seated on the upper face of the seat base upper end wall 20 in a position around the support tube 27. The numeral 31 indicates the inner diameter of the lower bearing plate 30. The lower bearing plate 30 functions as a lower bearing race for a plurality of ball bearings 34 which are rollably mounted in a circular groove 32 that is formed on the upper side of the lower bearing plate 30. As best seen in FIGS. 4 and 7, the ball bearings 34 are carried in a bearing plate retainer 33 which holds the ball bearings 34 in circular spaced positions.

Figure 8:
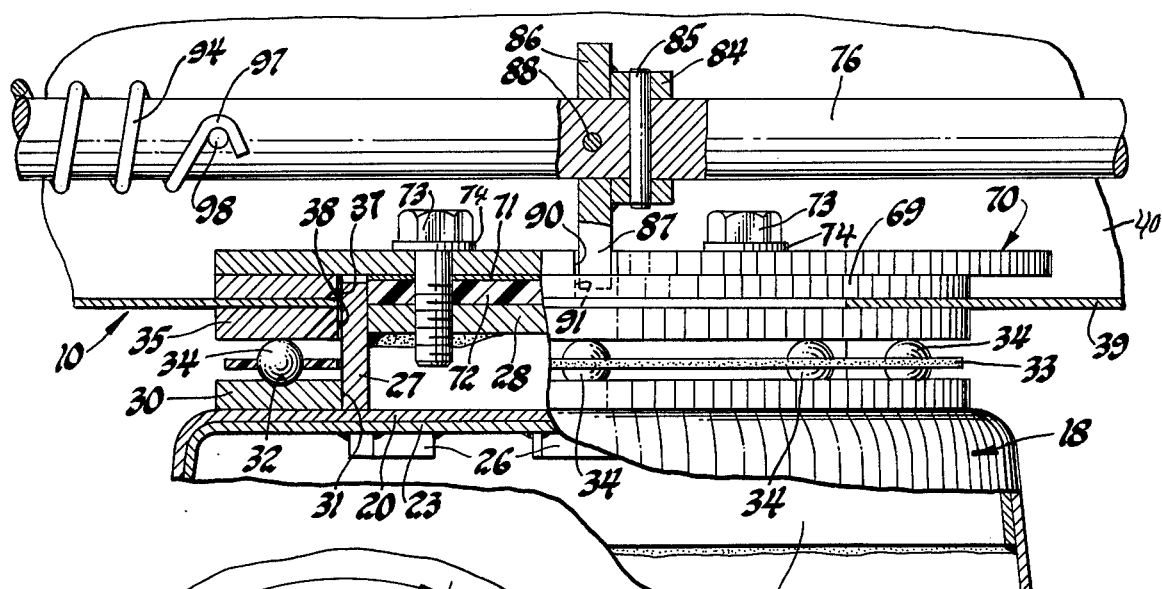
FIG. 8 is an enlarged, fragmentary view of a portion of the upper end of the seat support assembly illustrated in FIG. 2.

As shown in FIGS. 4 and 8, an upper bearing plate 35 in the form of a flat steel ring, is disposed above the bearings 34 and in rolling engagement therewith. The numeral 38 designates the inner diameter of the upper bearing plate 35 which is seated around the support tube 27 in a position in vertical alignment with the lower bearing plate 30. The upper bearing plate 35 functions as the upper bearing race for the roller bearings 34.

As shown in FIGS. 1 through 4, a center seat support plate 39 is provided with a circular opening 37 to allow the plate 39 to be seated around the upper end of the support tube 27 in a seating position on the upper face of the upper bearing plate 35. The upper bearing plate 35 is secured to the center plate 39 by any suitable means, as by welding. As shown in FIG. 1, the center plate 39 is provided along the front end thereof with an upwardly and forwardly sloping extension 40, which has integrally formed on the upper end thereof a transverse flange 41 which is extended forwardly at an obtuse angle relative to the extension 40. As shown in FIG. 1, the center plate 39 is provided along the rear end thereof with an upwardly extended rear vertical wall 50 which has formed on the upper end thereof an integral, forwardly and upwardly extended flange 49.

The center plate 39 has mounted on each end thereof a center seat side support assembly, generally indicated by the numerals 44 and 45. As shown in FIGS. 1 and 2, the side support assembly 45 includes a flange 42 along the lower side thereof which is integrally formed on the lower end of a vertical wall 55. As shown in FIG. 1, the flange 42 extends upwardly and forwardly along the inner side of the wall 55, and then vertically upward to where it is integrally joined to a top flange 57 that extends inwardly along the upper edge of the guide wall 55. As shown in FIG. 2, the other side support assembly 44 includes a side wall 52 which has a flange 53 along the lower edge thereof that extends along the bottom edge of the wall 52 in the same manner as the flange 42 on the wall 55. An integral flange 54 is formed along the upper edge of the side wall 52. As shown in FIG. 3, an integral flange 47 is formed on the rear end of the side wall 55 and extends around, and over, and into engagement with the vertical rear wall 50 of the center plate 39, and it is secured thereto, as by welding. A similar integral flange 46 is formed on the side wall 52, and is secured to the center plate 39 vertical wall portion 50, as by welding. The flange 41 on the center plate 39 is secured to the under side of the flange 54 and 57 by welding. The lower flanges 42 and 53 on the side support assemblies are secured to the center plate 39 by welding.

The side support assemblies 44 and 45 have fixedly secured, as by welding, on the upper flanges 54 and 57 thereof, a tubular structure for mounting a seat, as 11. As shown in FIG. 2, the tubular seat mounting structure on the side support assembly 44 includes a pair of angle bar members 58 and 59 which form a top side 65 on which is seated one side of the seat 11. A pair of angle bar members 60 and 61 are fixed on the flange 57 to form a seat supporting surface 67 for the other side support assembly 45. A channel member 66 is mounted within the angle members 60 and 61, and forms a support for mounting a pair of screws 64 for securing one side of the seat 11 in place. A similar channel 66 is also mounted within the angle bars 58 and 59, for holding a pair of suitable screws 64, and for holding the other side of the seat 11 in place.

Figure 6:
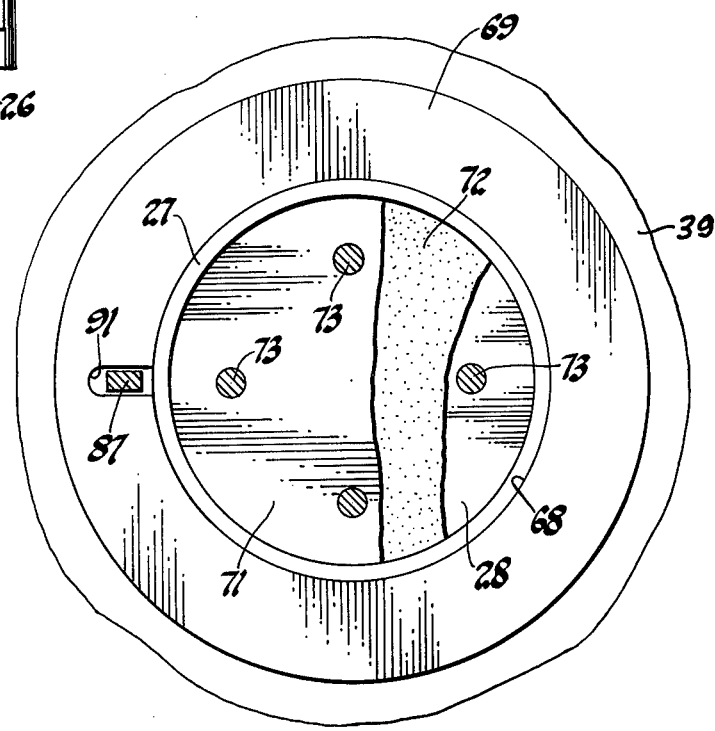
FIG. 6 is a fragmentary, horizontal section view of the seat support assembly illustrated in FIG. 4, taken along the line 6—6 thereof, and looking in the direction of the arrows.

As shown in FIGS. 4 and 6, a circular guide ring plate 69 is seated around the support tube 27, and it is secured to the top side of the center plate 39 by any suitable means, as by welding. A circular compression insert 72 is seated inside of the support tube 27, on top of the support plate 28, and in the free state it extends slightly above the upper end of the support tube 27. A circular steel wear plate 71 is seated on top of the compression insert 72. A stop plate, shown in FIGS. 3 and 4, is seated on top of the wear plate 71. A plurality of suitable shoulder screws 73 and lock washers 74 secure the stop plate 70 and the wear plate 71 to the support plate 28. When the shoulder screws 73 are secured in position, the compression insert 72 is put under compression, and it functions as an anti-rattle compression member. The compression insert 72 may be made from any suitable resilient material, as for example, a urethane material which has a durometer of 60. In one embodiment, the compression insert 72 was made to a thickness of 0.250 inch. The compression insert 72 functions to prevent noise as well as absorb noise.

Figure 9:
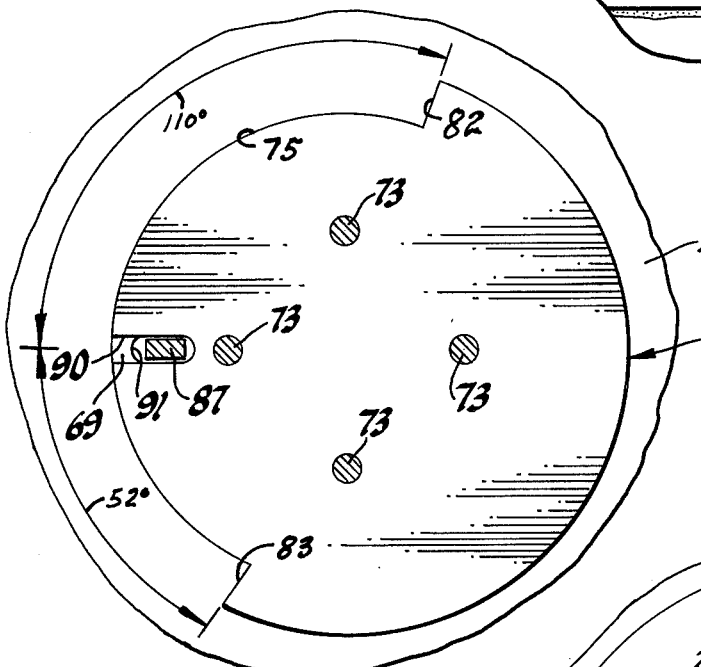
FIG. 9 is a fragmentary, horizontal section view of the structure illustrated in FIG. 4, taken along the line 9—9 thereof, and looking in the direction of the arrows.

As best seen in FIG. 3, the stop plate 70 is provided on the front end thereof with an arcuate edge 75 which terminates in a pair of stop shoulders 82 and 83. It will be seen that when the seat support assembly 10 is swiveled in a counterclockwise direction, as viewed in FIG. 3, that the stop shoulder 82 on the stop plate 70 will engage one side of a suitable stop member 89 which is fixedly mounted, by any suitable means, on the center plate 39 in a central position relative to the plate 39. The seat support assembly 10 is illustrated as a right side vehicle seat and can be swiveled counterclockwise, or in an inboard direction, for an arcuate distance of about 110° (FIG. 9). The seat support assembly 10 may be swiveled outboard, or in a clockwise direction, as viewed in FIG. 3, for an arcuate distance of about 52°. When the seat support assembly 10 is swiveled in an outboard direction, the stop shoulder 83 abuts the stop member 89 to limit the outboard movement of the seat assembly 10.

The seat support assembly 10 of the present invention is maintained in a normal position, as shown in FIGS. 1 through 4, by a suitable finger locking cam 86. The cam 86 is fixed by any suitable means, as by welding, on a steel tube 84 which is mounted on a transverse, spring loaded shaft 76. As shown in FIG. 8, the cam carrier tube 84 is secured to the shaft 76 by a suitable pin 85. The cam 86 is also secured to the shaft 76 by a suitable locking pin 88.

As shown in FIG. 3, one end of the shaft 76 is rotatably mounted in a circular seat 77 in the wall 52 of the side support assembly 44. The shaft seat 77 is formed by extruding a circular hole in the wall 52. The other end of the shaft 76 is rotatably mounted in a second extruded hole or circular seat 79 formed through the wall 55 of the side support assembly 45. The aforementioned one end of the shaft 76 is secured in place relative to the side support assembly wall 52 by a suitable washer 92 and a lock nut 78. The shaft 76 extends through the side support assembly wall 55, as shown by the numeral 80 in FIG. 3, and it is provided with a right angle turned portion on which is formed the handle 81 which has the end thereof rubber dipped.

As shown in FIG. 4, the locking cam 86 is provided with a downwardly extended nose portion 87 which is adapted to be seated in cam slots 90 and 91 formed through the stop plate 70 and the guide ring plate 69, respectively. As shown in FIGS. 2 and 3, the cam shaft 76 has a torsion spring 94 operatively mounted therearound which functions to maintain the shaft 76 in the normal use position shown in FIGS. 2 and 3, so as to maintain the cam 86 in the locked position, shown by the solid line position in FIG. 4. As best seen in FIG. 8, one end of the spring 94 is provided with a hook 97 which is mounted around a retainer pin 98 mounted in the shaft 76. As illustrated in FIG. 2, the other end of the spring 94 is provided with a straight end 95 which extends downwardly through a hole 96 formed through the center plate 39.

In normal use, the seat support assembly 10 of the present invention would be in the position shown in FIGS. 1 through 4. However, when it is desired to swivel the seat inboard or outboard, the operator grasps the handle 81 and pulls upwardly so as to move the locking cam 86 to the broken line raised position shown in FIG. 4. The operator may then swivel the seat inboard for a distance of 110° or outboard for a distance of 52°. The seat is illustrated as used on the right hand side of a vehicle, but it will be understood that the seat assembly may be provided to provide the same rotative conditions for a seat on the left hand side of a vehicle. The compression member 72 functions to prevent and eliminate noise when the seat assembly is swiveled.

While it will be apparent that the preferred embodiment of the invention herein disclosed is well calculated to fulfill the objects above stated, it will be appreciated that the invention is susceptible to modification, variation and change.

What is claimed is:

1. In a rotatable seat support assembly for supporting a seat for swiveling movement in opposite directions, the combination comprising:
   (a) a seat pedestal means;
   (b) a support tube fixedly mounted on said pedestal means;
   (c) a ring bearing means mounted around the support tube;
   (d) a seat support means mounted around said support tube;
   (e) means retaining said seat support means on said ring bearing means and on said support tube to prevent axial movement relative to said support tube and allow rotative movement about said support tube;
   (f) means for releasably locking said seat support means in a normal use position;
   (g) stop means for limiting a swiveling movement of the seat support means about the support tube; and,
   (h) anti-noise means mounted between said support tube and means for retaining said seat support means on the bearing means.

2. A rotatable seat support assembly as defined in claim 1, wherein said ring bearing means includes:
   (a) a lower bearing circular ring fixedly mounted on said seat pedestal means and surrounding said support tube;
   (b) an upper bearing circular ring fixedly mounted on said seat support means and surrounding said support tube; and,
   (c) a plurality of bearing members operatively mounted between said circular bearing rings.

3. A rotatable seat support assembly as defined in claim 2, including:
   (a) retainer plate means for retaining said bearing members in spaced apart positions.

4. A rotatable seat support assembly as defined in claim 2, wherein said seat support means includes:
   (a) a central plate mounted around said support tube and secured to said upper bearing circular ring.

5. A rotatable seat support assembly as defined in claim 4, wherein:
   (a) said means retaining said seat support means on the ring bearing means includes a stop plate attached to the support tube.

6. A rotatable seat support assembly as defined in claim 5, wherein:
   (a) said support tube is provided with a support plate mounted therein; and,
   (b) said anti-noise means is mounted in said support tube between said support plate and said stop plate.

7. A rotatable seat support assembly as defined in claim 6, including:
   (a) a wear plate mounted between said anti-noise means and said stop plate.

8. A rotatable seat support assembly as defined in claim 6, wherein:
   (a) said anti-noise means comprises a circular urethane insert.

9. A rotatable seat support assembly as defined in claim 6, wherein said stop means includes:
   (a) a stop member carried on said central plate; and,
   (b) a pair of stop shoulders formed on said stop plate.

10. A rotatable seat support assembly as defined in claim 6, wherein said means for releasably locking said seat support means in a normal position, includes:
    (a) an elongated shaft rotatably mounted on said seat support means and provided with an operating handle;
    (b) a locking cam fixed on said shaft and having a cam nose normally positioned in a slot formed through said stop plate; and,
    (c) means for normally biasing said shaft and locking cam into a releasable normal use position, with the cam nose seated in said slot in said stop plate, whereby when the shaft is rotated by the handle in a release direction, the cam nose is raised from said slot to allow swivelling movement of the seat support means about the support tube.

11. A rotatable seat support assembly as defined in claim 10, wherein:
    (a) said means for normally biasing said shaft and locking cam into the normal use position comprises a spring means.

* * * * *